United States Patent
Al Khawaja et al.

(10) Patent No.: US 9,547,215 B1
(45) Date of Patent: Jan. 17, 2017

(54) DEVICE FOR PERFORMING MULTIPLE OPTICAL OPERATIONS IN COMMUNICATION NETWORK

(71) Applicant: UNITED ARAB EMIRATES UNIVERSITY, Al Ain (AE)

(72) Inventors: Usama Al Khawaja, Al Ain (AE); Saeed Al Marzoug, Dammam (SA); Hocine Bahlouli, Dammam (SA)

(73) Assignee: UNITED ARAB EMIRATES UNIVERSITY, Alain (AE)

( * ) Notice: Subject to any disclaimer, the term of this patent is extended or adjusted under 35 U.S.C. 154(b) by 0 days.

(21) Appl. No.: 14/933,530

(22) Filed: Nov. 5, 2015

(51) Int. Cl.
   G02F 1/295 (2006.01)
   G02F 1/35 (2006.01)

(52) U.S. Cl.
   CPC ........... *G02F 1/3513* (2013.01); *G02F 1/3515* (2013.01)

(58) Field of Classification Search
   CPC .................................................. G02F 1/3513
   See application file for complete search history.

(56) References Cited

U.S. PATENT DOCUMENTS

| | | | | |
|---|---|---|---|---|
| 6,580,859 B1 * | 6/2003 | Maier | ................... | B82Y 20/00 385/122 |
| 6,801,685 B2 * | 10/2004 | Goodman | ............. | G02F 1/3513 385/27 |
| 7,149,379 B2 * | 12/2006 | Coleman | ............... | G02F 1/3515 385/16 |
| 7,352,970 B2 * | 4/2008 | Doran | ................ | G02B 6/29376 385/123 |

* cited by examiner

*Primary Examiner* — Rhonda Peace
(74) *Attorney, Agent, or Firm* — Buchanan, Ingersoll & Rooney PC (57) ABSTRACT

There is provided a device for performing an optical function, the device comprising one or more reflectionless potential wells in an array of waveguides; and one or more control solitons injected into the one or more reflectionless potential wells; wherein the one or more potential wells have potential well design parameters comprising a potential well number, and wherein the one or more control solitons have control soliton design parameters comprising a control soliton number and power; and wherein the optical function of the device is set by the potential well design parameters and the control soliton design parameters. There is also provided a method of manufacturing the device.

30 Claims, 11 Drawing Sheets

DEVICE FOR PERFORMING MULTIPLE OPTICAL OPERATIONS IN COMMUNICATION NETWORK

FIELD OF THE DISCLOSURE

The field of the present invention relates to device and method for performing multiple all-optical operations without any change in hardware configuration. More specifically, the present invention relates to an all optical device for performing an optical function such as a switch, diode or logic gate and method of manufacturing thereof.

BACKGROUND OF THE DISCLOSURE

During the past few decades there has been tremendous increase in demand for performing various optical processing/operations using a single device. Waveguides play an important role in this field. Waveguides have gained importance since they are used for communication in an optical network.

Typically, waveguides are manufactured by a number of ways. One of the most important techniques is using the femto-second laser in which straight waveguides of separation in the order of 5-30 μm and depth of few micro meters are prepared. These waveguides support self-focused beams denoted as discrete solitons, which is an envelope of the field intensities that extends over a minimum of five waveguides. The unique features of the solitons, particularly their dispersionless propagation, have encouraged many previous proposals to use them for the so-called all-optical operations.

One such device that uses solitons to perform the switching operations is a "blocker soliton". The blocker soliton is a high-intensity fixed power soliton that serves as a reflector of incoming signal. This device allows only signals of a certain velocity to pass, while reflecting others. This device however can only be used as switch. Further, the blocker soliton is not confined, which in turn leads to ruining the functionality of the device. The use of waveguides proves to be advantageous when solitons are considered for data transfer in order to confine the solitons for providing clean output and thereby resulting in robust functionality with almost no background radiation.

It is known that when the separation between waveguides is modulated, the associated coupling coefficient, which is proportional to the probability to tunnel from one waveguide to the next one, is also modulated according to an exponential law. For solitons propagating across the waveguides, this modulation is an effective potential. Designing the separations between the waveguides in a certain (pre-calculated) manner results in a special type of potential known as reflectionless potential. Scattering solitons off reflectionless potentials is characterized by clean particle-like scattering with almost no background radiation.

Now-a-days the use of optical fibers has become the new generation for data transfer. Such use of optical fibers has exceeded by orders of magnitude the speed and band width of the electronic means. However, these gains are downgraded by the use of electronic-based data processing at the user's end. Such downgrading resulted in the demand for all-optical data processing in order to be compatible with the high bit-rate optical data transfer. Hence, there arises a need for a practical solution that enables all-optical operations with a simple device made of waveguide arrays.

While all the above is known in the literature as theoretical or experimental facts, there is a need for a highly useful device which can act as a single device for performing multiple electronic operations of devices such as logic gates, diodes, switches and filters. Such a device shall increase the efficiency of an optical communication network in which it may be employed. Further, there is a constant need for improving the processing speed in the communication network and obtaining a clean output.

SUMMARY OF THE DISCLOSURE

In view of the foregoing disadvantages inherent in the prior-art and the needs as mentioned above, the general purpose of the present disclosure is to provide a system, method and device having an array of waveguides for performing multiple electronic operations, such as those of logic gates, diodes, switches and filters, to include all advantages of the prior art and to overcome the drawbacks inherent in the prior art offering some added advantages.

To achieve the above objectives and to fulfill the identified needs, in one aspect, the present invention aims to provide an all-optical device for performing multiple operations in a communication network.

In an aspect of the present invention, the all-optical device is capable of functioning as switch, logic gates and diodes. The device comprises an array of waveguides having a plurality of constant and modulated separations. These modulated separations generate one or more reflectionless potential well in the array of waveguides. One or more control solitons is injected into the one or more reflectionless potential well such that the adjustable power of the one or more control soliton transmits/reflects an incoming signal.

In another aspect of the present invention, a method for performing multiple operations such as those of switch, diode and logic gates in a communication network, by way of transmitting or reflecting an incoming signal via an all-optical device. The method includes receiving an incoming signal into an array of waveguides with a plurality of constant and modulated separations, such that the modulated separations generate one or more reflectionless potential wells. The incoming signal is then imprinted with phase gradient before entering into the array of waveguides.

After the signals enter into the device, the signals propagate into the array of waveguides and one or more control solitons, the one or more control solitons is injected into the one or more reflectionless potential wells and reflected/transmitted to the output port, wherein such reflection and transmission depends upon the power of the one or more control solitons where the varying power of the one or more control solitons enables the all-optical device to function as a switch, diode or a logic gate.

In yet another aspect of the present invention, the incoming signals are transmitted if the speed of the incoming signals is higher than a critical value, where the critical value depends upon the power of the control soliton.

In yet another aspect of the invention, there is provided a device for performing an optical function, the device comprising:

one or more reflectionless potential wells in an array of waveguides; and one or more control solitons injected into the one or more reflectionless potential wells;

wherein the one or more potential wells have potential well design parameters comprising a potential well number, and wherein the one or more control solitons have control soliton design parameters comprising a control soliton number and power; and wherein the optical function of the device is set by the potential well design parameters and the control soliton design parameters.

As a further aspect of the invention, there is provided a method of manufacturing a device for performing an optical function, the method comprising:

forming one or more reflectionless potential wells in an array of waveguides; and injecting one or more control solitons into the one or more reflectionless potential wells;

wherein the one or more potential wells have potential well design parameters comprising a potential well number, and wherein the one or more control solitons have control soliton design parameters comprising a control soliton number and power; and setting the optical function of the device by adjusting the potential well design parameters and the control soliton design parameters.

Preferably, the one or more control solitons are adapted to transmit or reflect incoming signals in a range of speed or power based on the control solitons design parameters.

Preferably, the one or more control solitons are adapted to transmit the incoming signals if the signals speed or power is higher than a critical speed or power value set based on the control soliton power.

Preferably, the range of speed or power is adjustable by adjusting the control soliton power.

Preferably, the optical function of the device is dynamically adjustable by adjusting the potential well design parameters and the control soliton design parameters.

Preferably, the optical function is a switch, a diode or a logic gate.

In an embodiment of the invention, the optical function is an optical switch and the potential well number is one and the control soliton number is one.

In an embodiment of the invention, the optical function is a logic gate and the potential well number is two and the control soliton number is two.

In an embodiment of the invention, the optical function is a diode and the potential well number is two and the control soliton number is one.

Preferably, the one or more control solitons are injected into the one or more reflectionless potential wells using Gaussian beams having a Gaussian beam intensity.

Preferably, the control soliton power is adjusted by adjusting the intensity of the Gaussian beam.

Preferably, the array of waveguides comprise a plurality of constant and modulated separations, the modulated separations forming the one or more reflectionless potential wells.

Preferably, the device is an all optical device.

As another aspect of the invention, there is provided an optical communication system comprising the device in accordance with the various embodiments of the invention.

Preferably, the communication system comprises an optical transmitter and an optical receiver. Preferably, the communication system comprises a communication network.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

Like numerals refer to like elements throughout the present disclosure.

DETAILED DESCRIPTION OF THE DISCLOSURE

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The terms "a" and "an" herein do not denote a limitation of quantity, but rather denote the presence of at least one of the referenced item.

The terms "having", "comprising", "including", and variations thereof signify the presence of a component.

The term "waveguide" as referred herein relates to a structure which is used for propagating a light signal with a minimal loss of energy by restricting expansion in one dimension or two.

The term "soliton" referred to herein relates to a quantum of energy that can be propagated as a travelling wave in nonlinear systems.

The term "signal" also interchangeably referred as "beam" or "soliton" refers to the incoming signal that is processed through the inventive all-optical device to perform various operations.

The term "switch" as referred herein relates to an electronic device which is generally used for switching signals from one circuit to another.

The term "logic gates" as referred herein relates to an electronic circuit with one or more input but only one output. The relationship between the input and the output is based on certain logic.

The term "optical network" as referred herein relates to a type of electronic communication communications network in which information is transmitted as optical signals.

The present invention relates to a system and method for performing different types of electronic operations using a single device. The electronic operations refer to functions of a switch, filter, logic gates and diode. The present invention is capable of functioning as any of the devices without any change in the physical configuration of the device.

Figure 1:
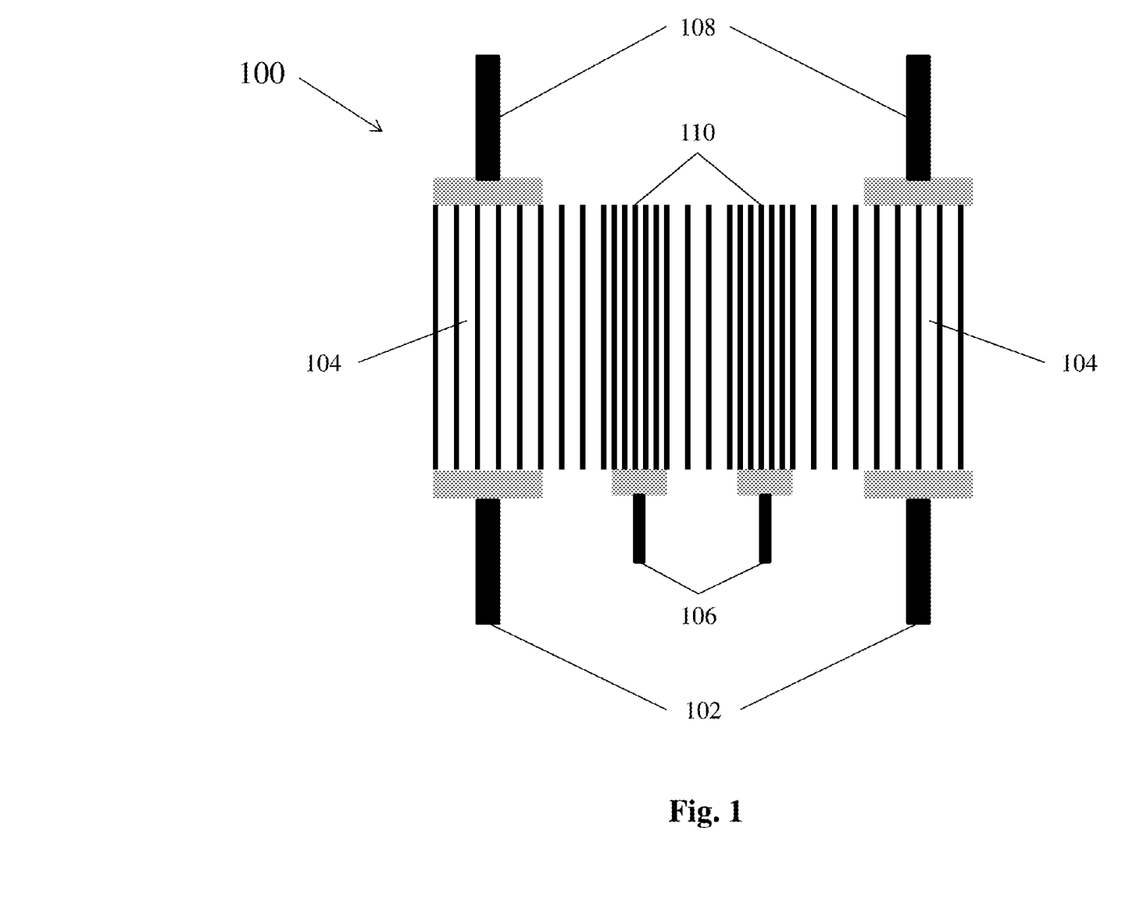
FIG. 1 illustrates a schematic figure of the device, in accordance with various embodiments of the present invention.

According to FIG. 1, as per an embodiment of the present invention, an all-optical device 100 is illustrated. The device 100 includes an array of waveguides 104 with constant separations between the waveguides apart from a certain region in the array where the separations are modulated such that an effective reflectionless potential well is created. Depending upon the requirement, one or more number of potential wells are created. For example, for switches and filters, one such potential well is needed but for diodes and logic gates two such potential wells are required.

The device 100 further includes one or more control solitons. The control soliton ports 106 are as illustrated in FIG. 1 help the device 100 to perform operations of a switch, logic gates, diode etc. without actually changing the physical configuration of the device 100. A stationary soliton with adjustable power is injected in the reflectionless potential well with the help of ports 106. The stationary soliton is called as a "control soliton" as it controls the functioning of the device. The presence of the control soliton effectively decreases the depth of the potential well working as a bridge over which incoming signal crosses the potential well 110.

In an embodiment of the present invention, the control soliton is created by injecting a Gaussian beam with width of about 5 waveguides into the potential well 110. The number of waveguides should not be construed as a limitation of the present invention as the number of waveguides is adjustable.

Once the Gaussian beam enters the input facet of the waveguide, a discrete soliton is created. The power of the resulting soliton is proportional to the intensity of the injected Gaussian beam. The power of the resulting soliton/control soliton is varied by varying the intensity of the pulse of the Gaussian beam injected into the potential well 110. The intensity of the injected Gaussian beam is controlled by the laser source which creates the Gaussian beam. The use of Gaussian beam for creating a control soliton should not be construed as a limitation of the present invention. There may be variations of such usage.

The transmission/reflection of an incoming signal is performed depending upon the power of the control soliton injected into the potential well 110. And hence, the power of control soliton determines the functioning of device 100 in association with the number of potential wells 110. Therefore, device 100 with a single potential well 110 and one control soliton functions as a switch or a filter and device 100 with two potential wells 110 and two control solitons functions as logic gates (AND, OR, NAND, and NOR) in addition to functioning as a diode with adjustable polarity.

The presence of the reflectionless potential well in the device 100 results in the incoming signal to scatter freely from unwanted radiation dissipating the energy of the signals and it also helps to bind the control soliton so that it does not escape out of the potential well.

Figure 2:
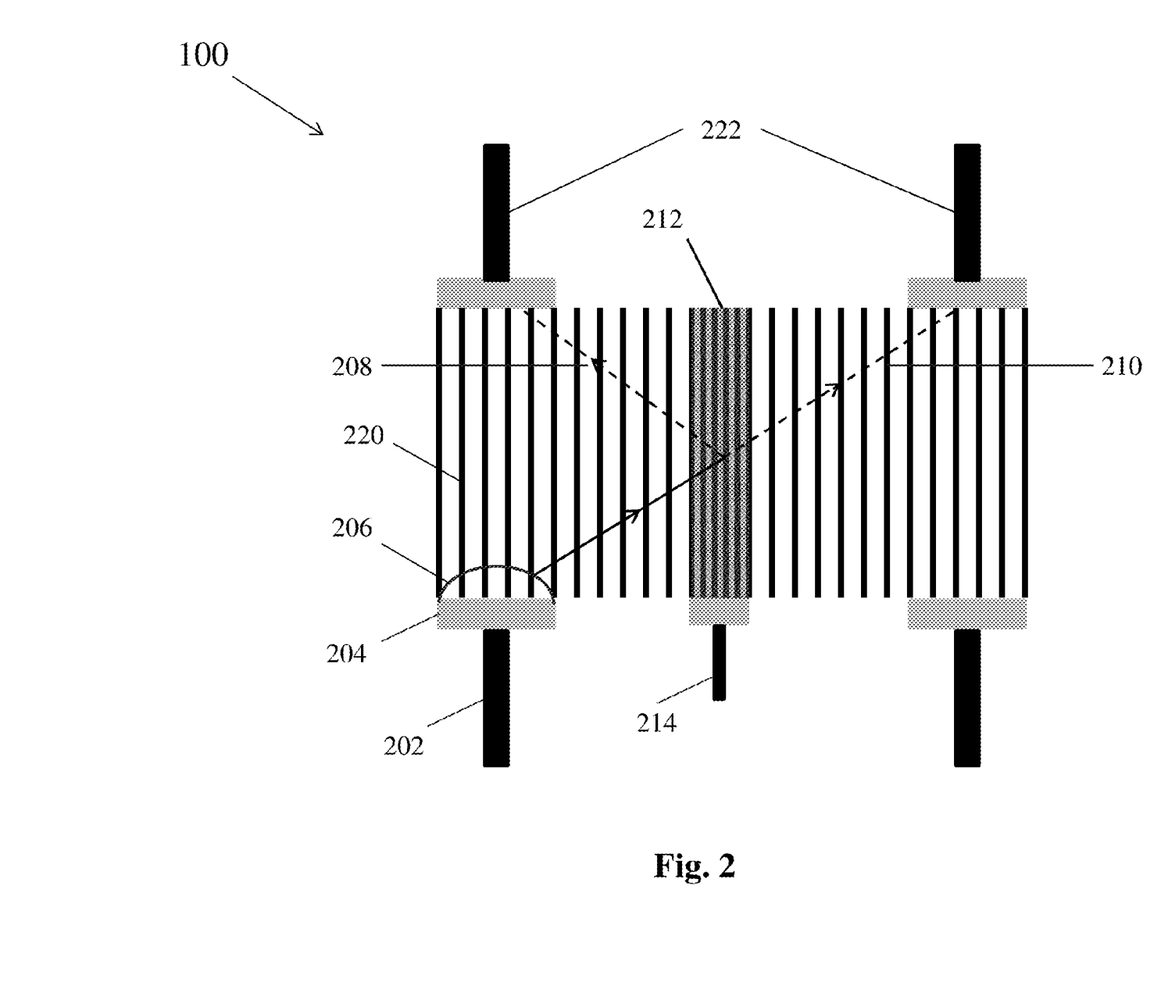
FIG. 2 illustrates the device functioning as a switch, in accordance with various embodiments of the present invention.

An exemplary working of the all-optical device 100 is illustrated in FIG. 2. A broad beam or incoming signal that spans across several waveguides is injected into the array of waveguides 220 with separations through one of the input ports 202 of the device 100. A phase gradient at 204 is imprinted on the beam or signal just before entering the array 220 which generates a signal 206 with a group velocity. The group velocity is the speed of the beam with which the beam travels across a waveguide or an array of waveguides.

In an embodiment of the present invention, the device 100 when works as a switch as illustrated in FIG. 2, works with a single potential well 212 and one control soliton operated through control soliton port 214. The signal 206 is transmitted if it has a speed larger than a critical value i.e. speed or power. The signal 206 is filtered according to its speed or power. The critical values of speed or power are dependent on the power of the control soliton. Therefore, the ranges of signal 206 speeds or powers that will be allowed to pass can be selected, in a manner making a signal 206 to reflect just by increasing the power of the control soliton. This critical value of the speed or power is dependent on the power of the control soliton. The critical value of the speed or power is decided depending upon the range of power of the control soliton. The sharp transitions at a critical soliton speed or amplitude are important for the designing of a filter or a switch.

After the operation of the control soliton, the signal 206 either reflects and forms a reflecting signal 208 or forms a transmitted signal 210. If the output is taken from either of the output ports 222, from the signal, this amounts to switching off the signal 206. The switching is very sharp and clean in the sense that there is no splitting of the signal, it either transmits or reflects.

The critical values i.e. speed or power of the signal 206, also depend on the depth and width of the potential well. Therefore, the injection of the control soliton and manipulation of the power of the control soliton 214, either increase or decrease the critical speed of the signal 206. In this manner, switching or filtering is done with a control soliton and without any modulation of the input signal.

Figure 3A:
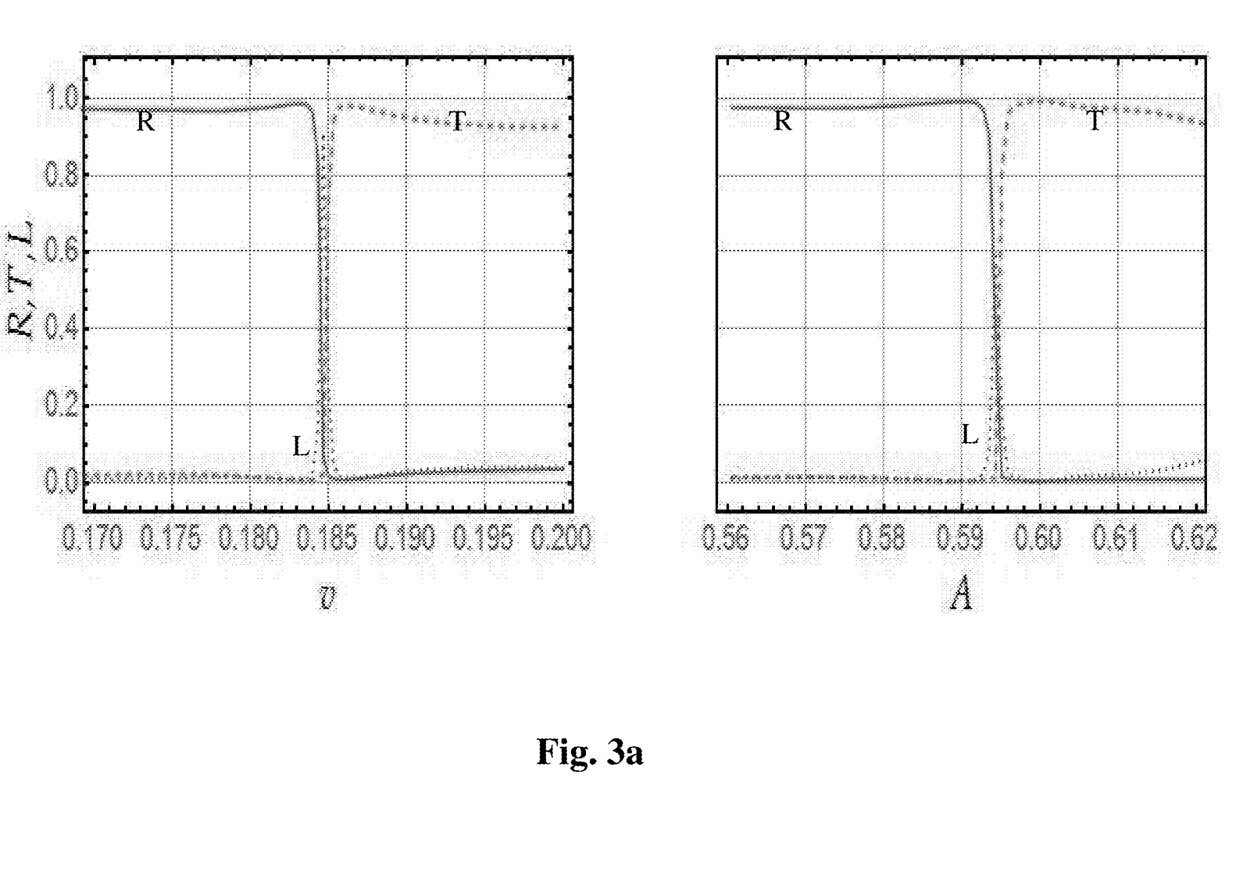
FIGS. 3a and 3b illustrate the influence of the critical value i.e. speed or power, on the switching action of the all-optical device 100, in accordance with various embodiments of the present invention.

As illustrated in FIG. 3a, an exemplary graphical representation of the transport coefficients versus signal initial velocity v and amplitude A, depicting reflection R with solid curve and transmission T with dashed curve, trapping L with the dotted curve.

Figure 3B:
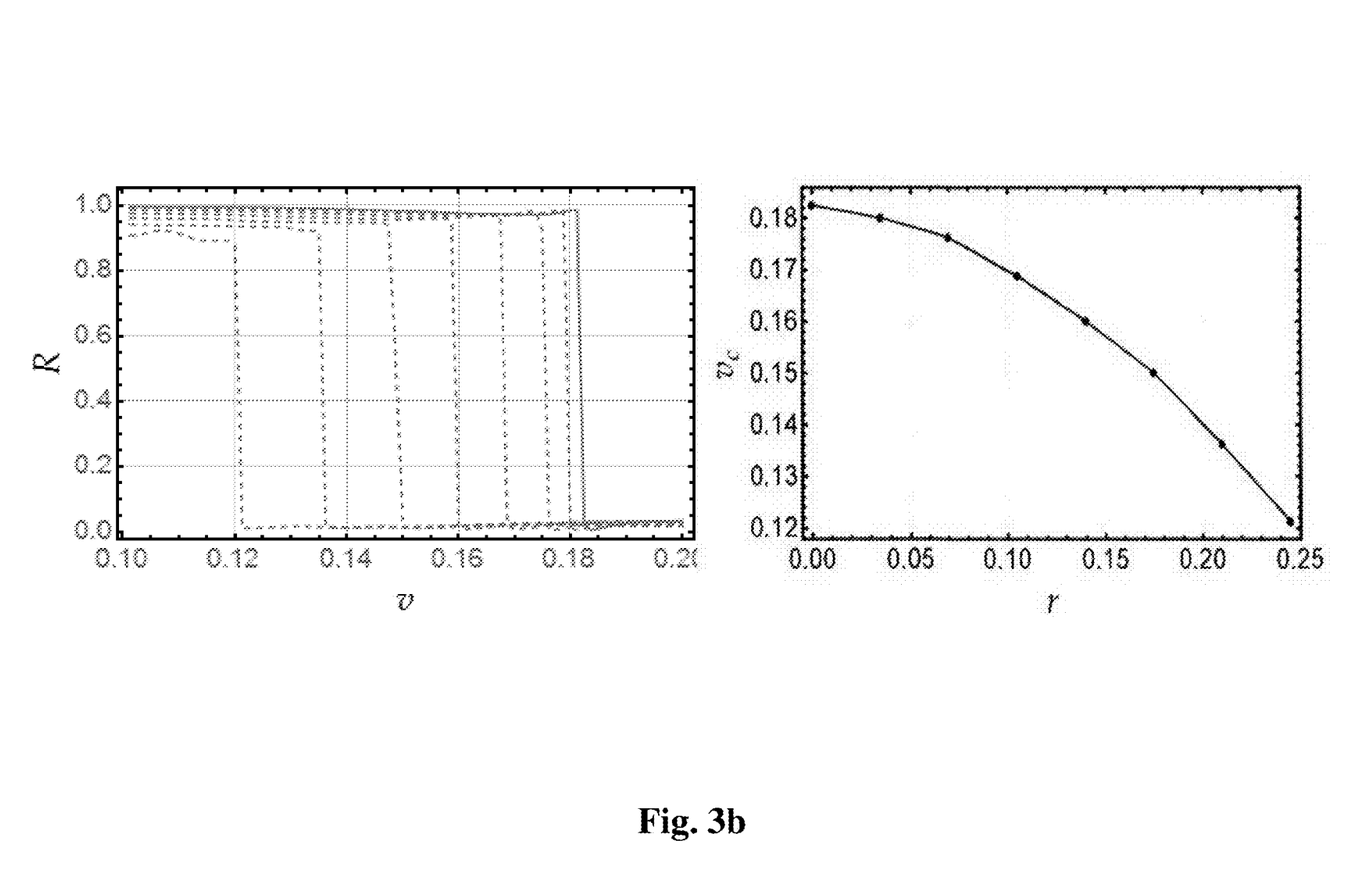

According to various embodiments of the present invention, FIG. 3b illustrates two graphs for reflectance R versus signal speed for different powers of control soliton. The value of the critical speed depends on the power of the control soliton, as illustrated in FIG. 3b. Accordingly, with the increase in the power of the control soliton, the critical speed decreases. Consequently, the decrease in the power of the control soliton results in an increase of the critical speed.

Figure 4:
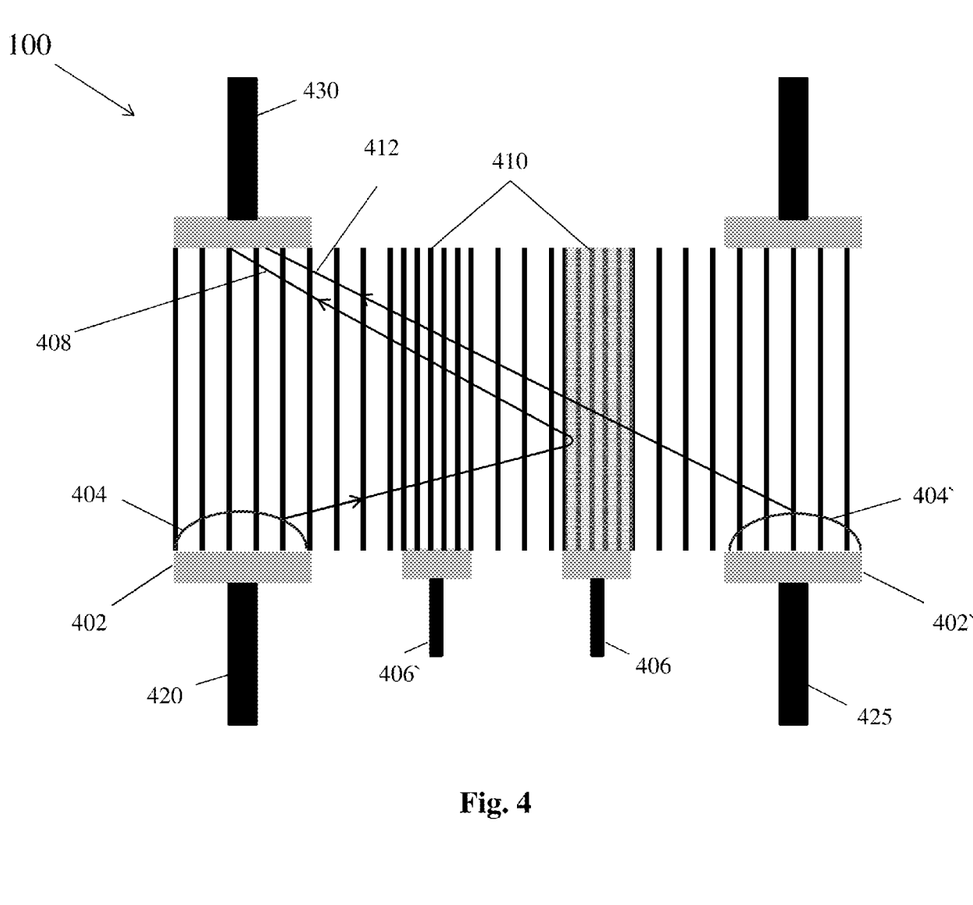
FIG. 4 illustrates a schematic figure of the unidirectional flow of the signal when the device functions as a diode, in accordance with various embodiments of the present invention.

According to another embodiment of the present invention, as illustrated in FIG. 4, the all-optical device 100 acts as a diode. Unidirectional flow of the incoming signal or the use of device as a diode occurs when an incoming signal is scattered (reflected and/or transmitted) across two reflectionless potential wells with slightly different depths. The device 100 as illustrated in FIG. 4 includes two potential wells 410 and one control soliton controlled via a control soliton port 406. Injecting the control soliton in only one potential well breaks the symmetry of the device and thereby results in a unidirectional flow.

As illustrated in FIG. 4, the incoming signal is allowed in the device 100 through the input ports 420 and 425. A phase gradient is applied at 402 and 402' and the signals 404 and 404' are then allowed in the array of waveguides. The presence of two potential wells 410 but only single control soliton via port 406 results in a reflection of the signal 404 and in a transmission of the signal 404'. This is equivalent to the functioning of the electronic diode wherein the signal is allowed only in one direction. Due to the presence of only one control soliton in between two potential wells allows unidirectional flow of the incoming signals 404 or 404' from the input ports 420 and 425 respectively. The common output is obtained at output port 430. Consequently, within a finite velocity window, the signal is transmitted if incident from the right (i.e. 404') and is reflected if incident from the left (404). This is equivalent to a diode which allows signals to pass only in the left direction or it can be said as only one direction.

In another embodiment of the present invention, the polarity can be reversed by injecting the control soliton at 406'. In this case, the incoming signal 404' from port 425 will be reflected and the incoming signal 404 from port 420 will be transmitted, thereby a reversing effect is obtained.

Figure 5:
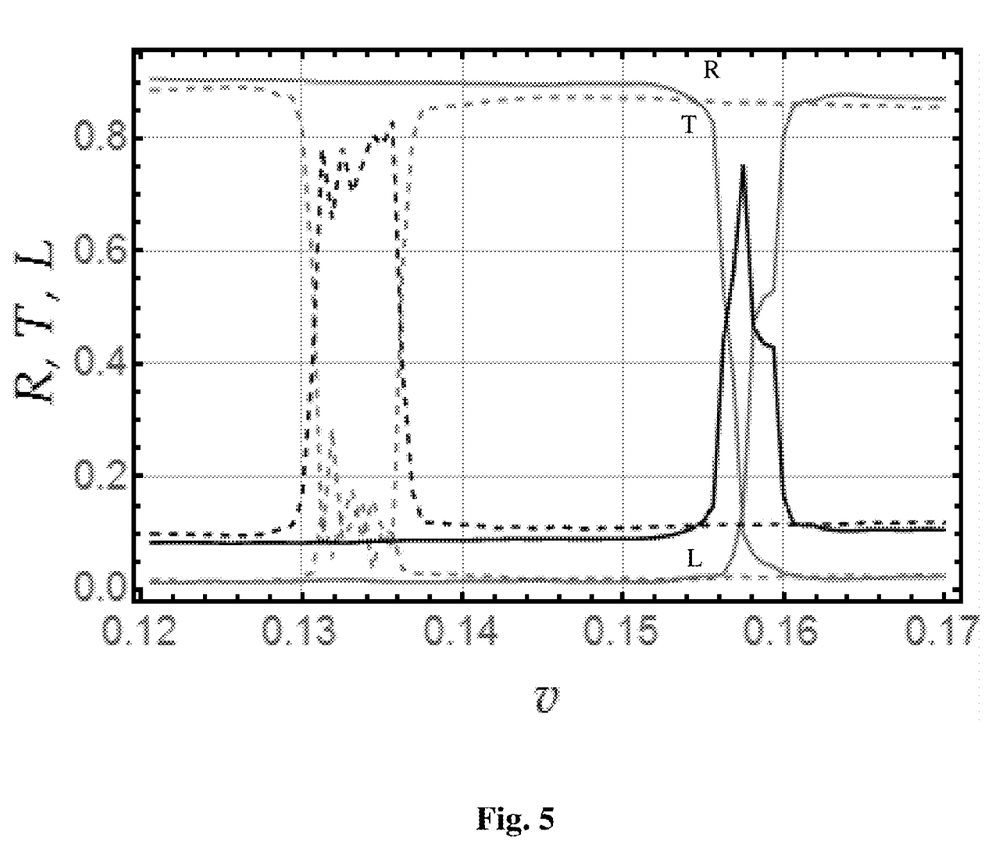
FIG. 5 illustrates diode behavior with signal scattering off a double potential well from both directions, in accordance with various embodiments of the present invention.

The working of the device 100 as a diode, as illustrated in FIG. 4 is explained in conjunction with the graphical representation in FIG. 5 of device 100 where its behavior with signal scattering off in the double potential well from both directions is illustrated.

In an embodiment of the present invention, FIG. 5 illustrates a unidirectional flow of incoming signal obtained within a velocity range of "$v \in [0.1375, 0.1550]$". A diode behavior of device 100 is shown with signal scattering off a double potential well 410 from both directions. Solid curves correspond to signal incidence from the left (404) and dashed curves correspond to incidence from the right (404') as illustrated in FIG. 5 with reflection (R), transmission (T) and trapping (L).

For instance, at v=0.15 as in FIG. 5, a signal incident from the left (404) has almost full reflection (408), R solid curve and a signal incident from the right (404') has almost full transmission (412), dashed T curve.

In several embodiments of the present invention, an all-optical device 100 is a Logic Gate. The setup as in FIG. 4 of a unidirectional flow is used to obtain logic operations such as AND, OR, NAND, NOR, etc. The all-optical device 100 functions as logic gates by reducing the power of the control solitons to almost half that of unidirectional flow.

Figure 6:
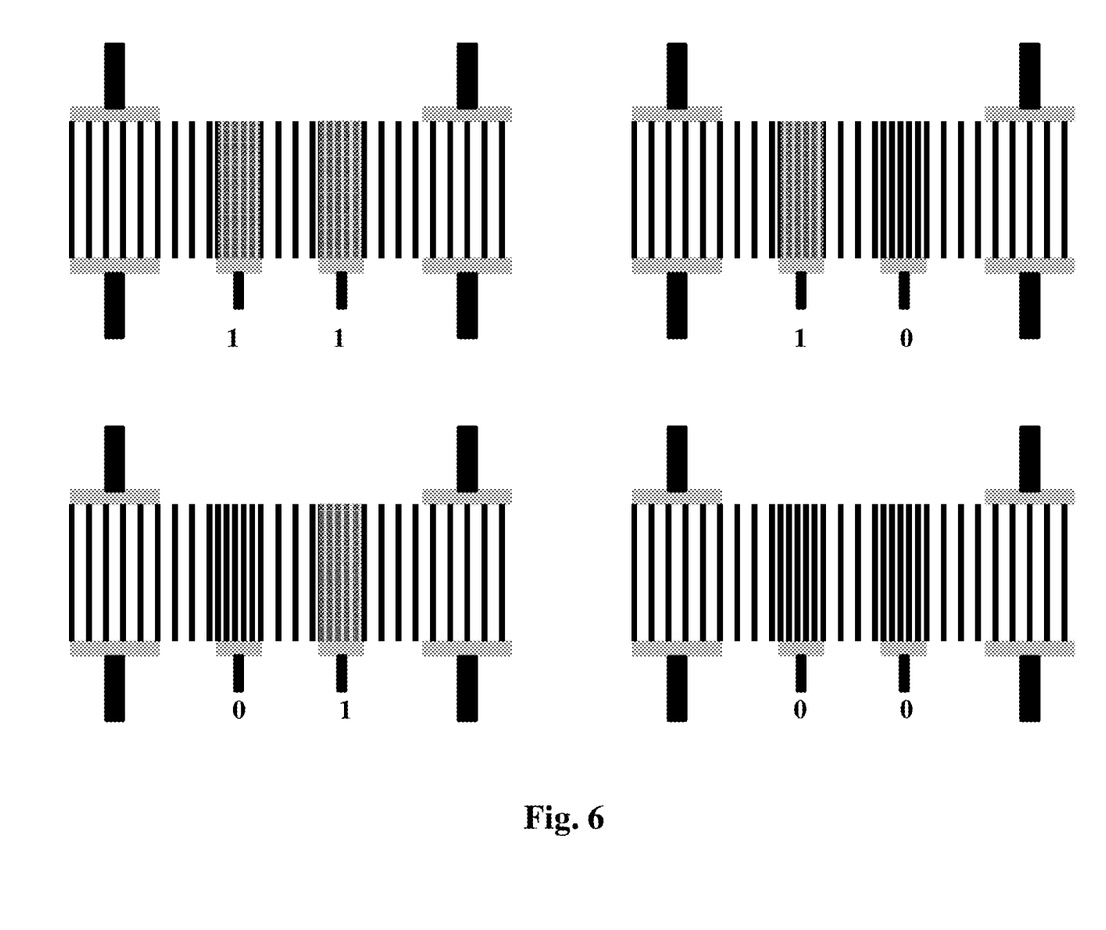
FIG. 6 illustrates a schematic figure showing the logic gates device with the 4 different possibilities of injecting or not interjecting two control solitons in the potential wells, in accordance with various embodiments of the present invention.

FIG. 6 illustrates various functions of the device 100. The input signals of the logic gates in FIG. 6 are taken as "1" if there is a control soliton in the potential well and "0" when there is none. Considering representation in FIG. 6, such as "11" corresponds to two equal control solitons in the potential wells, "01" or "10" corresponds to a control soliton in only one potential well, "00" corresponds to no control solitons in either potential wells. The output is taken from scattered signal which can be reflected, transmitted or trapped.

FIG. 6 illustrates the schematic showing the logic gate device with four different possibilities of injecting or not interjecting two control solitons in the potential wells. When there are two control solitons in the two potential wells, the input of the logic gate is considered as "11". Taking the output from the transmitted signal and considering the velocity range "$v \in [0.18, 0.21]$" of the input signal, the device 100 will transmit the signal only if there are two control solitons and for all other inputs (00, 01, 10), the signal reflects. In that case the device 100 is an AND gate.

The presence of one control soliton causes the input to be "10". Taking the output from the reflected signal and within the same velocity range as for "AND" gate i.e. "$v \in [0.18, 0.21]$" of the input signal, the signal is reflected when the inputs are 00, 01, and 10, but not with the input "11". This is clearly the "NAND" gate or the negation of the AND gate.

Considering the output from transmitted signal and within the velocity range "$v \in [0.21, 0.23]$" of the input signal, the signal is transmitted for all inputs 00, 01, and 10, but for input "11" the signal is reflected. This configuration results in an OR gate.

Taking the output from the reflected signal, within the same velocity range of the OR gate, namely "$v \in [0.21, 0.23]$", the signal is reflected only when the input is 11. Consequently, the device 100 is then a "NOR" gate.

Figure 7:
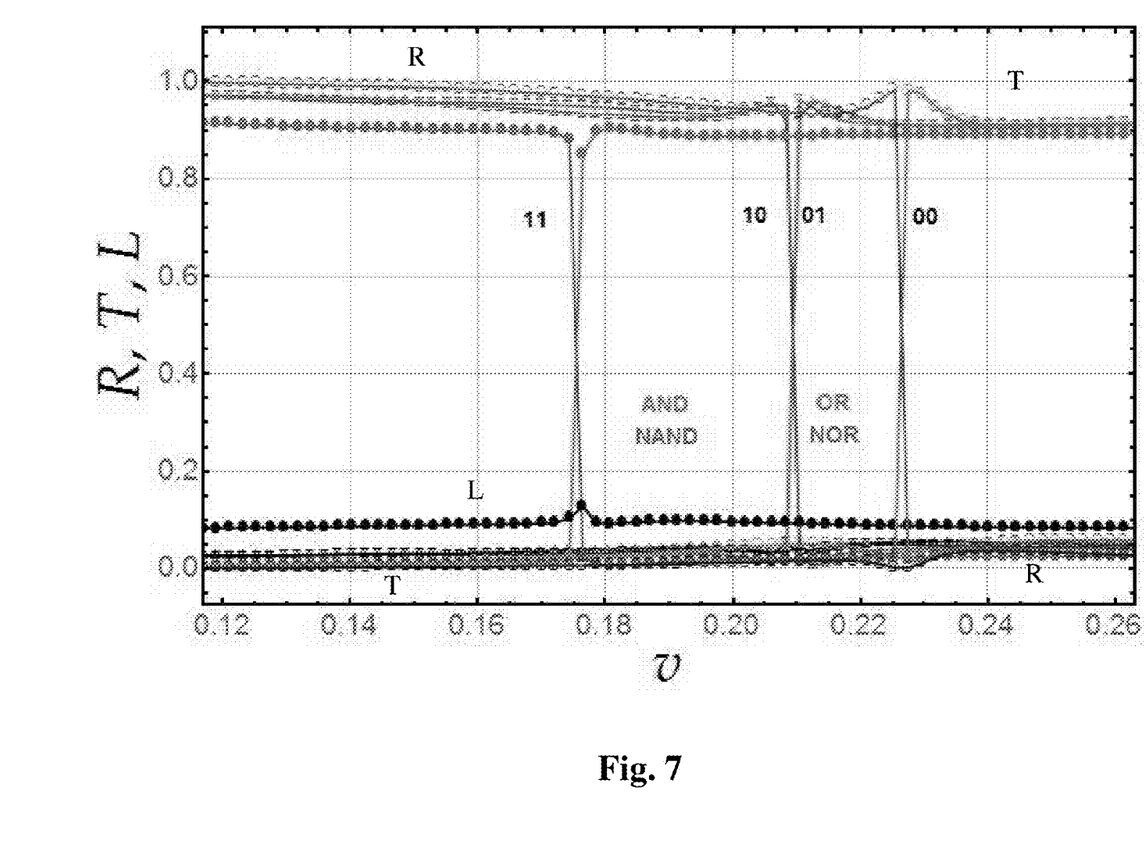
FIG. 7 illustrates a logic gates performance shown with signal scattering off a double potential well, in accordance with various embodiments of the present invention.

In an exemplary embodiment of the present invention, FIG. 7 illustrates graphical representation of the performance of device 100 as "Logic Gates" with signal scattering off a double potential well. R curve corresponds to reflection, T corresponds to transmission and L corresponds to trapping. Filled circles correspond to the presence of control solitons in both wells (11). Upper and lower triangles correspond to the presence of a control soliton in the left or right well (10 or 01), respectively. Empty circles correspond to the absence of control solitons from both wells (00). The AND and NAND gates work within the signal velocity range "$v \in [0.175, 0.210]$" and the OR and NOR gates work within the range "$v \in [0.21, 0.225]$".

The table below is an exemplary velocity ranges of the signal and corresponding functions of the device 100.

| | Output | | | |
| | Transmission | | Reflection | |
| Input | $v \in$ [0.175, 0.21] | $v \in$ [0.21, 0.225] | $v \in$ [0.175, 0.21] | $v \in$ [0.21, 0.225] |
|---|---|---|---|---|
| 00 | 0 | 0 | 1 | 1 |
| 01 | 0 | 1 | 1 | 0 |
| 10 | 0 | 1 | 1 | 0 |
| 11 | 1 | 1 | 0 | 0 |
| GATE | AND | OR | NAND | NOR |

Figure 8:
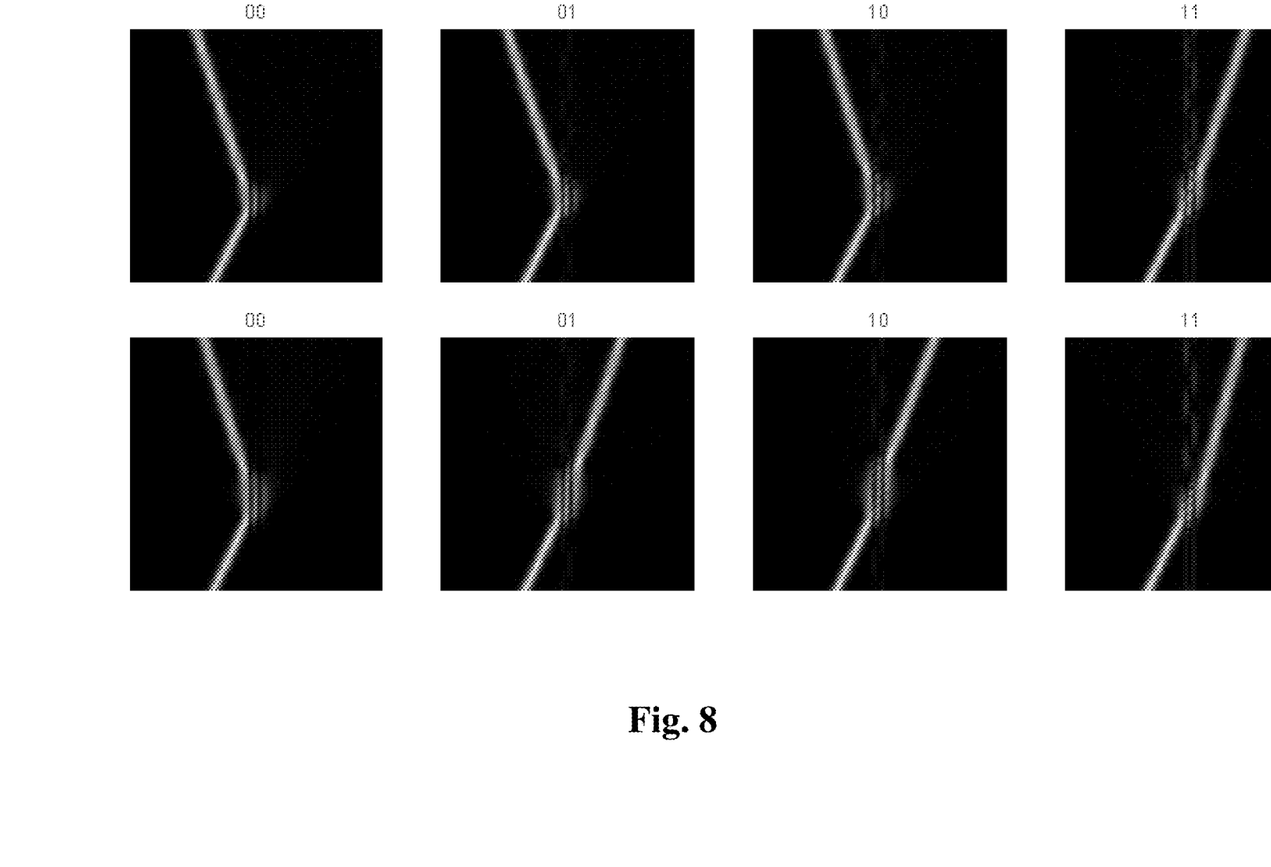
FIG. 8 illustrates an exemplary example of density plots corresponding to two selected points from FIG. 4 showing the AND and NAND gates, with initial signal soliton speed v=0.19, in the upper panel and the OR and NOR gates, with initial signal soliton speed v=0.215, in the lower panel, in accordance with various embodiments of the present invention.

In an embodiment of the present invention as illustrated in FIG. 8, density plots corresponding to two selected points from FIG. 2, showing the AND and NAND gates, with initial signal speed v=0.19, in the upper panel and the OR and NOR gates, with initial signal speed v=0.215, in the lower panel.

Figure 9:
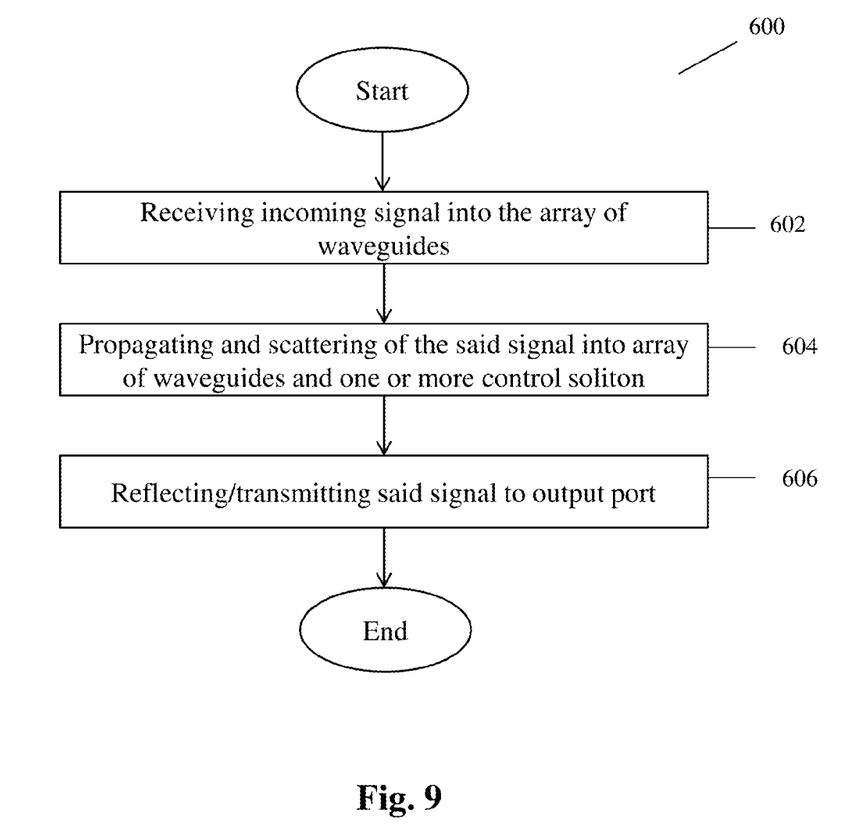
FIG. 9 illustrates a flowchart showing various steps for the functioning of the present device.
Figure 10A:
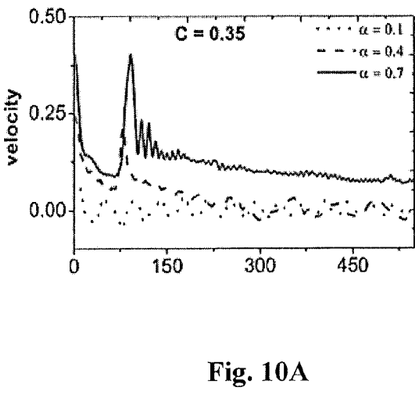
FIG. 10A illustrates a time dependent soliton speed for different initial soliton speeds at coupling constant 0.35.
Figure 10B:
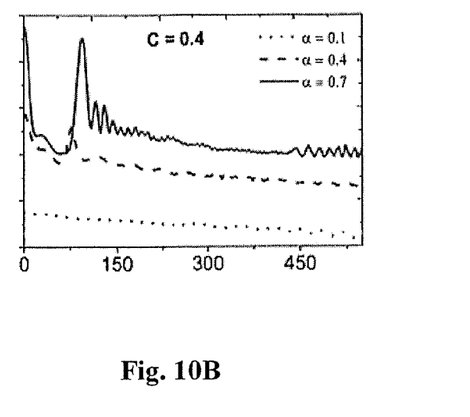
FIG. 10B illustrates a time dependent soliton speed for different initial soliton speeds at coupling constant 0.4.
Figure 10C:
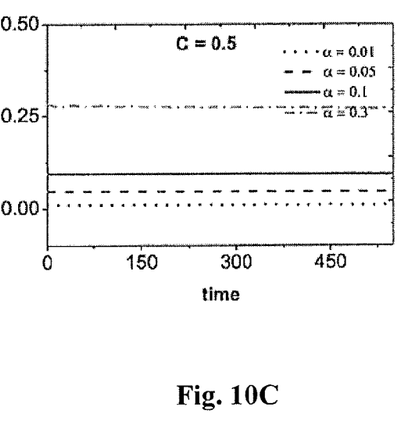
FIG. 10C illustrates a time dependent soliton speed for different initial soliton speeds at coupling constant 0.5.
Figure 10D:
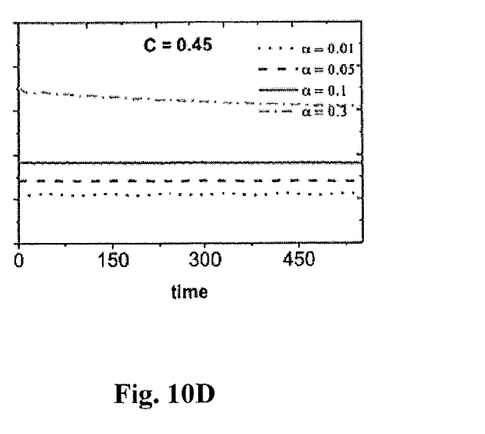
FIG. 10D illustrates a time dependent soliton speed for different initial soliton speeds at coupling constant 0.45.

Referring to FIG. 9, there is shown a method 600 regarding the working of the proposed all-optical device 100. This method 600 is being explained in conjunction with FIG. 1 which describes the all-optical device 100. At step 602, the device 100 receives the incoming signals in the form of beams at the input ports 102. The incoming beams are imprinted with phase gradient before entering the array of waveguides in the device 100. Such imprinting of the phase gradient on the incoming beam generates a soliton/beam with a group velocity. Once the phase gradient is imprinted, the beam enters the device 100 and propagates and scatters among the array of waveguides and control solitons at step 604 of the method 600. Importantly, such scattering of the soliton/beam inside the array of waveguides of device 100 results into contact of the beam with the control solitons. The beam is transmitted if the speed of the beam is higher than a critical value at step 606. This critical value is dependent on the power of the control solitons. The control solitons are provided with a range of power which can be varied depending upon the demand of how the device is required to be used. The critical value is dependent upon this range and is predefined for the device to work as a switch or diode or a logic gate.

In order to make the invention more clear and better, a theoretical model and numerical procedure for the functioning of the device describing an exemplary embodiment of the present invention are provided herein below:

Theoretical Model

Propagation of solitons in a one-dimensional array of N waveguides with focusing nonlinearity can be described, in the tight-binding approximation, by the following discrete nonlinear Schrödinger equation (DNLSE) for the normalized mode amplitude $\psi_n$, $$i\frac{\partial \psi_n}{\partial z} + C_{n,n-1}\psi_{n-1} + C_{n,n+1}\psi_{n+1} + \gamma|\psi_n|^2\psi_n = 0, \quad (1)$$

where n is an integer number associated with the waveguide channel, z is the propagation distance, $C_{n,m}$ are the coupling coefficients between different waveguide channels n and m, and γ is the strength of the focusing nonlinearity. It should be known to a person skilled in the art that the DNLSE governs the propagation of the discrete solitons in the waveguide array.

This model is not integrable but it admits numerical stable solitonic solutions such as the on-site (OS) and the inter-site (IS) solitons (13). Both are localized sech-like modes but differ in being either localized on one waveguide (OS) or being localized between two consecutive waveguides (IS). Due to the presence of Peierls-Nabarro effective potential, there are no movable exact solutions in this model (19). However, moving stationary solitons may preserve their integrity to a large extent apart from some kinetic energy loss in terms of background radiation. For the dynamical processes such an approximate solitonic behavior is adequate and the processing time is considerably smaller than that for the soliton to cause changes in its shape or speed considerably.

The main reason for choosing waveguide arrays to perform all-optical processes is that effective potential wells can be realized simply by modulating the separation between the waveguides. It was found experimentally that the coupling strength between waveguides decreases exponentially with increase in their separation as in prior art. This fact has indeed been used to study the scattering of linear pulses off reflectionless potentials. Considering a modulation of the coupling constants, through their separation, in the following form $$C_{n,n-1}=C+V(n-1), C_{n,n+1}=C+V(n+1), \quad (2)$$

and substituting in Eq. (1), we obtain DNLSE with an effective potential $$i\frac{\partial \psi_n}{\partial z} + C\psi_{n-1} + C\psi_{n+1} + V(n-1)\psi_{n-1} + V(n+1)\psi_{n+1} + \gamma|\psi_n|^2\psi_n = 0. \quad (3)$$

It is essential for the potential to be of reflectionless type. This guarantees the required sharp transitions of the transport behavior from full reflection to full transmission and the absence of background radiation. Exact solitonic solutions of integrable models provide such a reflectionless potential. In the present case, we used the integrable Ablowitz-Ladik model $$i\frac{\partial \psi_n}{\partial z} + (\psi_{n-1} + \psi_{n+1})(C + |\psi_n|^2) = 0; \quad (4)$$

to construct the reflectionless potential from its exact soliton solution $$\psi_n^{AL} = \sqrt{C}\sinh(\mu)\text{sech}[\mu(n - n_0)]\exp(i\beta z), \quad (5)$$

with β=2C cos h(μ), μ is the inverse width of the soliton, and $n_0$ corresponds to the location of the soliton peak. Following equation (2), the coupling is modulated as follows—

$$C_{n,n\pm 1} = C + |\psi_{n\pm 1}^{AL}|^2, \quad (6)$$

and Eq. (3) becomes $$i\frac{\partial \psi_n}{\partial z} = -C(\psi_{n-1} + \psi_{n+1}) = |\psi_{n-1}^{AL}|^2\psi_{n-1} - |\psi_{n+1}^{AL}|^2\psi_{n+1} - \gamma|\psi_n|^2\psi_n. \quad (7)$$

Clearly, the potential is a sech²-like modulation in an otherwise constant coupling. This can be achieved by a corresponding reduction in the separation of the waveguides according to the exponential law found in the experiment of A. Szameit et. Al "Control of directional . . . written waveguides".

Manipulating the dispersion coefficient, C, breaks the hermiticity of the Hamiltonian corresponding to Eq. (7). The usual remedy to this problem is the usage of the following symmetrized coupling coefficients:

$$C_{n,n\pm 1}^S = \sqrt{(C + |\psi_n|^2)(C + |\psi_{n\pm 1}|^2)}. \quad (8)$$

An alternative procedure is by introducing an n-dependent strength of the nonlinearity that transforms Eq. (7) to an integrable form. The modulated nonlinearity strength has to introduced in accordance with the integrability conditions found in prior art for the continuum case, namely $\gamma_{n,n\pm 1}=\gamma_0/C_{n,n\pm 1}^2$ where $\gamma_0$ is an arbitrary constant. It is verified numerically that the two procedures lead to a Hermitian Hamiltonian by checking the conservation of the soliton norm and energy. Here, first procedure is adopted and hence Eq. (7) becomes $$i\frac{\partial \psi_n}{\partial z} = -C_{n,n-1}^S \psi_{n-1} - C_{n,n+1}^S \psi_{n+1} - \gamma |\psi_n|^2 \psi_n, \text{ where} \quad (9)$$

$$C_{n\pm1}^S = \sqrt{(C + |\psi_n^{AL}|^2)(C + |\psi_{n\pm1}^{AL}|^2)}. \quad (10)$$

For an exponential decay of coupling in terms of separation such as $$C_{n,n\pm1}^S = C \exp\left(1 - \frac{D_{n,n\pm1}}{D_0}\right), \quad (11)$$

where $D_{n,n\pm1}$ is the separation between waveguides n and n±1, and $D_0$ and $\alpha$ are positive constants, the separation between waveguides that gives rise to an effective potential is obtained by inverting the last equation, namely $$D_{n,n\pm1} = D_0\left[1 - \log\left(\frac{C_{n,n\pm1}^S}{C}\right)\right]. \quad (12)$$

This practical relation can be used to design specific effective potentials. For an effective potential well, Eq. (10) shows that $C_{n,n\pm1}^S > C$ for all n, i.e., an upward profile above the constant background C. Therefore, the equivalent profile of wave guide separations should be a downward profile below the constant seperations of $D_0$. Explicitly, an effective single potential well can be obtained, from Eq. (10), with the modulated coupling constants $$C_{n\pm1}^S = C\{[1 + \sinh^2(\mu)\text{sech}^2\mu(n - n_0)] \times \quad (13)$$
$$[1 + \sinh^2(\mu)\text{sech}^2\mu(n \pm 1 - n_0)]\}^{1/2}.$$

This is achieved by the separations' profile given by Eq. (12), namely $$D_{n,n\pm1} = D_0\left[1 - \frac{1}{2}\log[1 + \sinh^2(\mu)\text{sech}^2(\mu(n - n_0))] - \quad (14)$$
$$\frac{1}{2}\log[1 + \sinh^2(\mu)\text{sech}^2(\mu(n \pm 1 - n_0))]\right].$$

Similarly, a double potential well is obtained by generalizing Eq. (10) as follows $$C_{n,n\pm1}^S = \left[\left(C + |\psi_{1,n}^{AL}|^2 + |\psi_{2,n}^{AL}|^2\right) \times \left(C + |\psi_{1,n\pm1}^{AL}|^2 + |\psi_{2,n\pm1}^{AL}|^2\right)\right]^{1/2}, \quad (15)$$

where $\psi_{1,2}^{AL}$ are two exact solitonic solutions centered a different waveguides which take the form $$\psi_{i,n}^{AL} = \sqrt{C}\sinh(\mu_i)\text{sech}[\mu_i(n - n_i)]\exp(i\beta_i z), \quad i = 1, 2, \quad (16)$$

with $\beta_i = 2C \cos h(\mu_i)$, $\mu_i$ is the inverse width of the i-th soliton, and $n_i$ corresponds to the locations of the i-th soliton's peak.

Numerical Procedure:

Typically, stationary solitons of Eq. (1) are first obtained using Newton-Raphson or iterative methods. For the real time evolution the fourth-order Runge-Kutta method is used with a stationary soliton as the initial profile. Once a stationary soliton is given an initial speed, it starts to move generally with deceleration, as mentioned above. The time dependent soliton speed is shown in FIGS. 10A to 10D for different initial soliton speeds and coupling constants. Clearly for coupling strengths C=0.35 and C=0.4 the motion of the soliton is far from being similar to that of a free soliton moving with constant speed. For C=0.45 and C=0.5 the motion is considerably smoother especially for the larger values of the initial speed where we also noticed that there is constant velocity reduction. Therefore, to exploit the solitonic feature efficiently numerical investigations were conducted using C=0.45, with initial speed range v~0.2-0.3, and time less than about 300. Furthermore, it can be verified that the larger values of coupling the difference in the free energy of the OS and IS solitons will be small. Therefore, the ~ results obtained here do not change considerably when the OS and IS solitons are used.

First, the stationary soliton, $\psi^{ST}$ of the homogeneous DNLSE is found, in Eq. (1) with constant coupling. Then, in real time a soliton is evolved that has a stationary soliton profile and moves with an initial speed, v, namely $\psi^{ST}e^{iv}$. A reflectionless single or double potential well is constructed using n-dependent coupling coefficients according to Eq. (10) or Eq. (15). The control soliton is a stationary soliton that is injected at the minimum of the potential well and has the same profile as that of the signal soliton, $r\psi^{ST}$, apart from the power control parameter r. For a soliton initially moving to the right and located at $n_0$ and generally two potentials located at $n_1$ and $n_2$, such that $n_0<n_1<n_2$, the transport coefficient are defined as follows:

reflection $$R = \sum_1^{n_1-\delta_n} |\psi_n|^2 \Big/ \sum_1^{N^-} |\psi_n|^2,$$

transmission $$T = \sum_{n_2+\delta n}^{N} |\psi_n|^2 \Big/ \sum_1^{N} |\psi_n|^2,$$

and
trapping $$L = \sum_{n_1+\delta n}^{n_2+\psi n} |\psi_n|^2 \Big/ \sum_1^{N} |\psi_n|^2$$

where N is the number of waveguides and $\delta_n$ is roughly equal to the width of the soliton in order to avoid the inclusion of the tails of the trapped soliton with the reflected or transmitted ones. For the soliton moving from the right to the left, the expression for T and R should be interchanged. A preliminary investigation of the scattering outcomes in terms of potential and soliton parameters including potential depth, width, location, soliton initial speed, phase, and type gives an idea of the ranges of parameters for which a useful application could be obtained as explained in previous sections.

The present invention provides a device, system and method for performing multiple electronic operations has many advantages and is much better as compared to the prior art. The present device performs multiple electronic operations without changing the physical configuration of the device. Most importantly, the use of solitons instead of linear pulses has drastically increased the processing speed in the optical network. The generation of reflectionless potential well from the modulated separations of the waveguides in the array of waveguides is another great advantage of the present invention. Further the injection of one or more control solitons in the array of waveguides results in a clean output as compared to the known prior art. Further the control solitons simply control the outcome and does not leave the reflectionless potential well and thereby not interfering with the output signal leading to a robust and reliable performance.

Another great advantage is the manufacturing of the array of waveguides with modulated separations which is practically simple with currently known technologies.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. A device for performing an optical function, the device comprising:
    one or more reflectionless potential wells in an array of waveguides; and
    one or more control solitons injected into the one or more reflectionless potential wells;
    wherein the one or more potential wells have potential well design parameters comprising a potential well number, and wherein the one or more control solitons have control soliton design parameters comprising a control soliton number and power; and
    wherein the optical function of the device is set by the potential well design parameters and the control soliton design parameters.

2. The device as claimed in claim 1, wherein the one or more control solitons are adapted to transmit or reflect incoming signals in a range of speed or power based on the control solitons design parameters.

3. The device as claimed in claim 2, wherein the one or more control solitons are adapted to transmit the incoming signals if the signals speed or power is higher than a critical speed or power value set based on the control soliton power.

4. An optical communication system comprising the device as claimed in claim 3.

5. The device as claimed in claim 3, wherein the range of speed or power is adjustable by adjusting the control soliton power.

6. The device as claimed in claim 5, wherein the optical function of the device is dynamically adjustable by adjusting the potential well design parameters and the control soliton design parameters.

7. The device as claimed in claim 5, wherein the optical function is a switch, a diode or a logic gate.

8. The device as claimed in claim 7, wherein the optical function is an optical switch and wherein the potential well number is one and the control soliton number is one.

9. The device as claimed in claim 7, wherein the optical function is a logic gate and wherein the potential well number is two and the control soliton number is two.

10. The device as claimed in claim 7, wherein the optical function is a diode and wherein the potential well number is two and the control soliton number is one.

11. The device as claimed in claim 5, wherein the one or more control solitons are injected into the one or more reflectionless potential wells using Gaussian beams having a Gaussian beam intensity.

12. The device as claimed in claim 11, wherein the control soliton power is adjusted by adjusting the intensity of the Gaussian beam.

13. An optical communication system comprising the device as claimed in claim 2.

14. An optical communication system comprising the device as claimed in claim 5.

15. The device as claimed in claim 1, wherein the array of waveguides comprise a plurality of constant and modulated separations, the modulated separations forming the one or more reflectionless potential wells.

16. The device as claimed in claim 1, wherein the device is an all optical device.

17. An optical communication system comprising the device as claimed in claim 1.

18. A method of manufacturing a device for performing an optical function, the method comprising:
    forming one or more reflectionless potential wells in an array of waveguides; and
    injecting one or more control solitons into the one or more reflectionless potential wells;
    wherein the one or more potential wells have potential well design parameters comprising a potential well number, and wherein the one or more control solitons have control soliton design parameters comprising a control soliton number and power; and
    setting the optical function of the device by adjusting the potential well design parameters and the control soliton design parameters.

19. The method of manufacturing of claim 18, wherein the one or more control solitons are adapted to transmit or reflect incoming signals in a range of speed or power based on the control solitons design parameters.

20. The method of manufacturing of claim 19, wherein the one or more control solitons are adapted to transmit the incoming signals if the signals speed or power is higher than a critical speed or power value set based on the control soliton power.

21. The method of manufacturing of claim 20, wherein the range of speed or power is adjustable by adjusting the control soliton power.

22. The method of manufacturing of claim 21, wherein the optical function of the device is dynamically adjustable by adjusting the potential well design parameters and the control soliton design parameters.

23. The method of manufacturing of claim 21, wherein the one or more control solitons are injected into the one or more reflectionless potential wells using Gaussian beams having a Gaussian beam intensity.

24. The method of manufacturing of claim 23, wherein the control soliton power is adjusted by adjusting the intensity of the Gaussian beam.

25. The method of manufacturing of claim 18, wherein the optical function is a switch, a diode or a logic gate.

26. The method of manufacturing of claim 25, wherein the optical function is an optical switch and wherein the potential well number is one and the control soliton number is one.

27. The method of manufacturing of claim 25, wherein the optical function is a logic gate and wherein the potential well number is two and the control soliton number is two.

28. The method of manufacturing of claim 25, wherein the optical function is a diode and wherein the potential well number is two and the control soliton number is one.

29. The method of manufacturing of claim 18, wherein the array of waveguides comprise a plurality of constant and modulated separations, the modulated separations forming the one or more reflectionless potential wells.

30. The method of manufacturing of claim 18, wherein the device is an all optical device.

* * * * *